May 22, 1951            E. GREENE            2,554,419
ELECTRIC PROTECTIVE SYSTEM FOR VEHICLE TIRES
Filed April 14, 1947            3 Sheets-Sheet 1
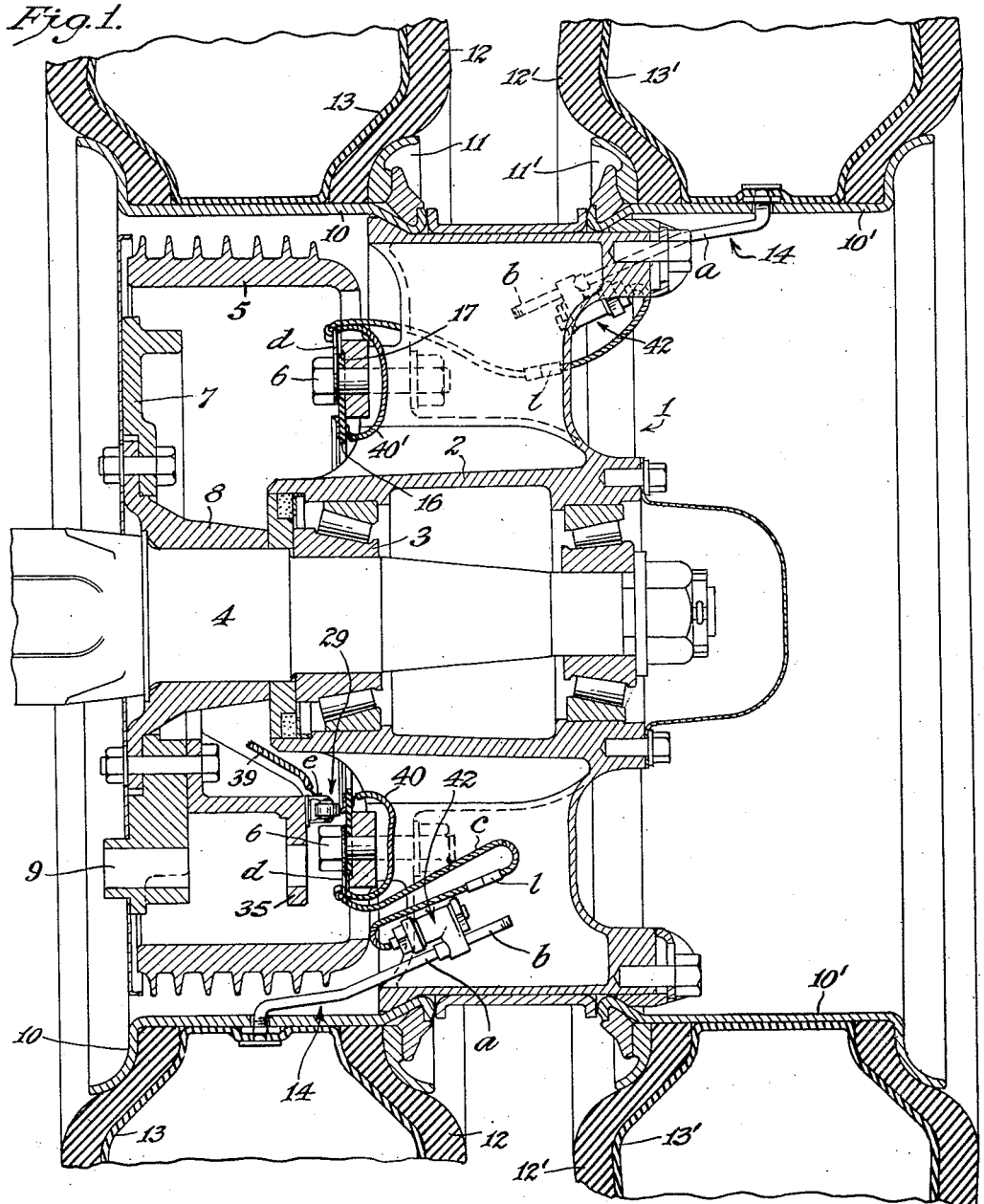
INVENTOR:
EDGEWORTH GREENE,
BY
His ATTORNEY.

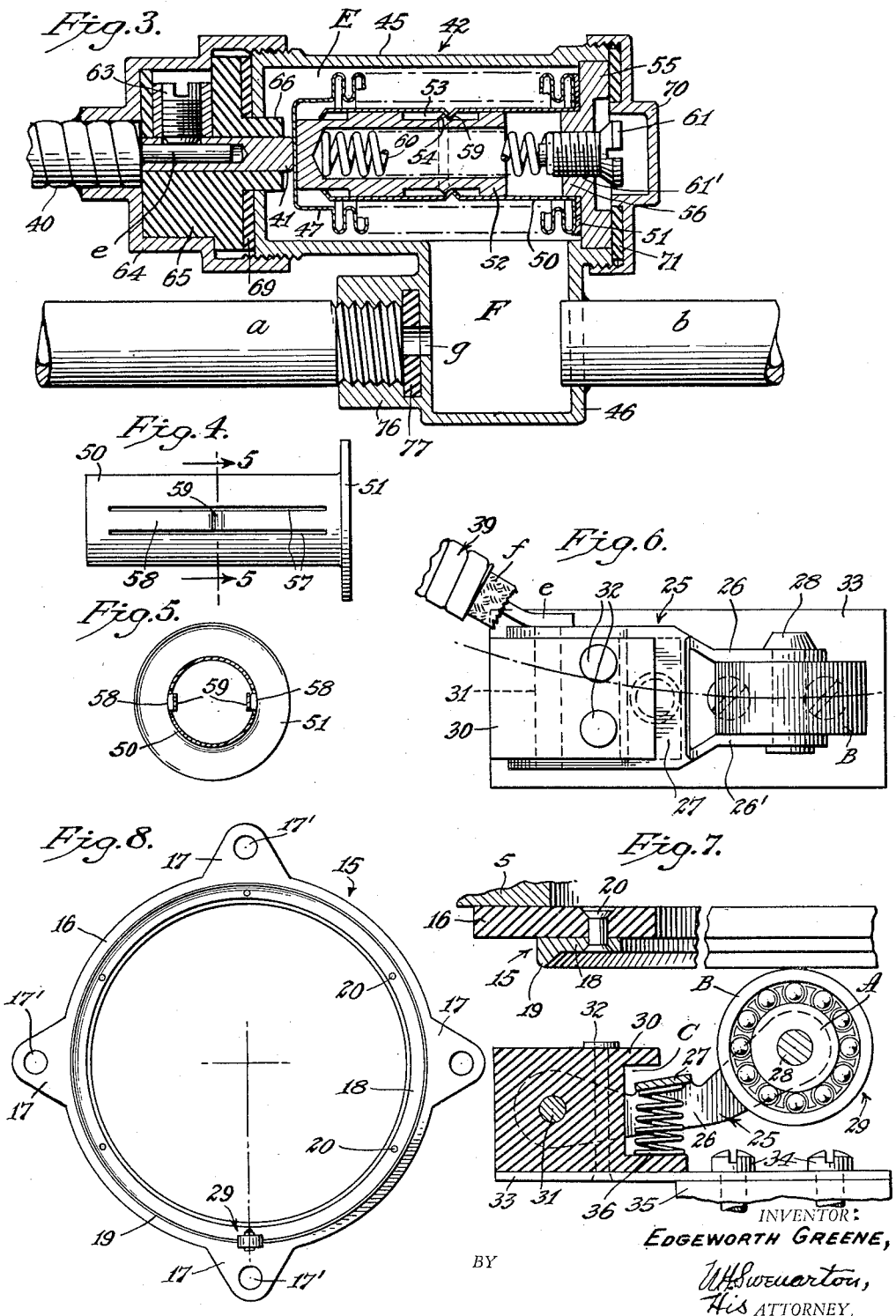

Patented May 22, 1951

2,554,419

UNITED STATES PATENT OFFICE 2,554,419

ELECTRIC PROTECTIVE SYSTEM FOR VEHICLE TIRES

Edgeworth Greene, Little Falls, N. J.

Application April 14, 1947, Serial No. 741,291

1 Claim. (Cl. 173—324)

This invention relates to an electric protective system for the tires of vehicles such as automobiles, railway cars, airplanes and the like with a view to preventing the undue deflation thereof before the operator of the vehicle has received a warning signal, either visual or audible.

Among the principal objects of the invention are the provision of an efficient current-conducting assemblage for electrically bridging the gap between each wheel, especially during rotation thereof, and the adjacent portion of the chassis of the vehicle whereby, upon deflation of the tire mounted thereon, below a fixed minimum, an electric circuit, controlled by a pneumatically operated switch associated with the valve stem of such tire, can be established to operate an electric signal on the vehicle body.

Heretofore, as I am well aware, it has been proposed to electrically bridge the said gaps between the wheels and chassis of an automobile by providing insulated loadless bearings which are supplemental to the main load-carrying main bearings all as set forth in the Patent No. 2,293,852 of August 25, 1942, and accordingly no claim is made herein of a scope to include such prior disclosure.

In the following description and drawings forming a part thereof, I have disclosed certain preferred embodiments of the invention, it being understood that various modifications within the scope of the appended claim may be made without departing from the spirit of my invention.

Referring to the drawings,

Figure 1 is a fragmentary, diametrical transverse section, partially in elevation, of a dual truck wheel, such as commonly employed on a trailer, which is equipped with my improved current-conduction assemblage.

Fig. 2 is a diagrammatic view of the hook-up of the said protective system;

Fig. 3 is an enlarged fragmentary longitudinal section, partially in elevation, of the electro-pneumatic switch, isolated, which is employed in said system and with which the valve stems of each tire of the trailer is equipped;

Fig. 4 is an elevation of the tubular liner or insert of the pneumatic switch member;

Fig. 5 is a transverse section, taken on the line 5—5 of Fig. 4;

Fig. 6 is an enlarged fragmentary plan view of the ball-bearing contact element of the current-conducting assemblage, isolated;

Fig. 7 is an enlarged fragmentary vertical section, partially in elevation, of the ring contact and the co-operating ball-bearing contact elements of the said assemblage;

Fig. 8 is an enlarged elevation of each contact ring, isolated; and

Figure 9:
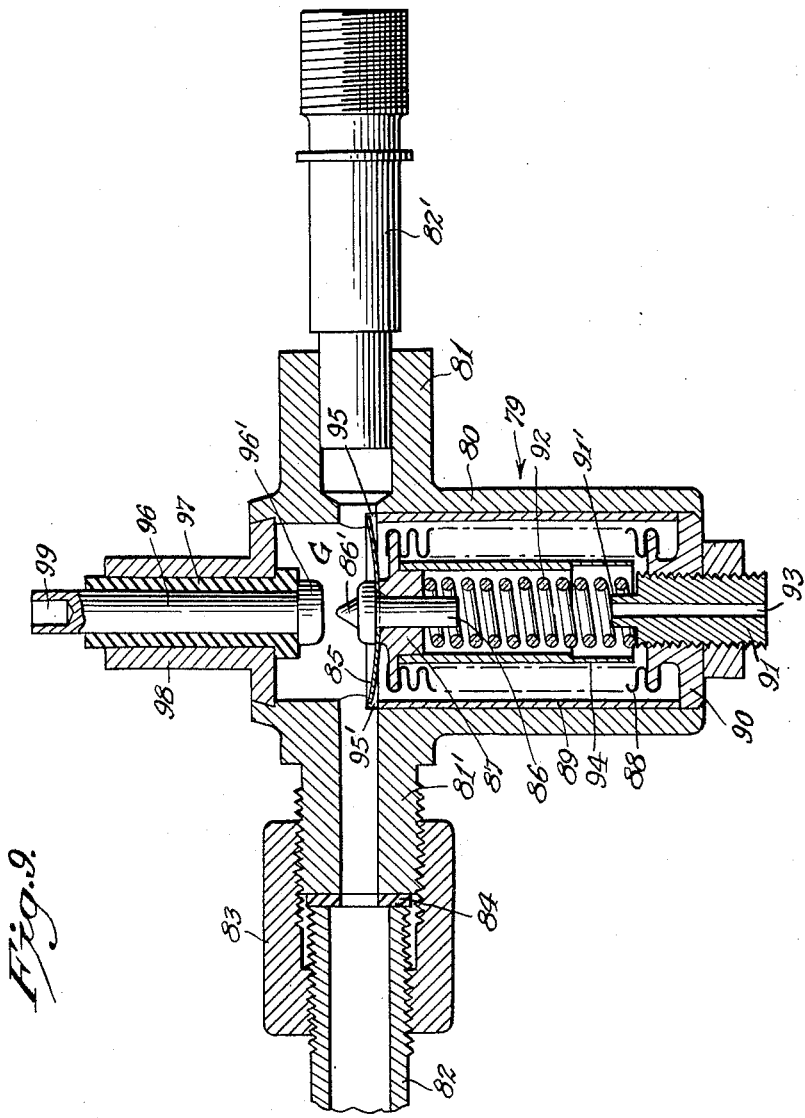
Fig. 9 is a horizontal section of a modified form of electro-pneumatic switch when it is at its low point on a wheel whose tire is equipped therewith.

Referring to the construction of the current-conducting assemblage and tire-pressure indicator interposed in the circuit thereof, as illustrated in the drawings, the reference numeral 1 designates the dual wheel of a truck trailer, the same having a hub 2 equipped with the usual load roller bearings 3, the said hub serving to receive a stationary axle member 4. A brake-drum 5 is rigidly secured to said wheel by bolts 6 and a stationary brake-support member 7, having a hub 8, is loosely mounted on the said axle 4, the same being bolted to the vehicle chassis by bolts (not shown) which project through a series of apertures 9 formed in the member 7, which shows but one. Conventional braking mechanism, either hydraulic or mechanical (not shown), is supported by said brake-support member 7.

Said wheel is provided with circumferential felloes 10, 10' adapted to receive the removable rim elements 11, 11' which serve to retain tire shoes 12, 12' in the well-known manner. Inner tubes 13, 13' are mounted in the usual manner within said shoes, the same of each being equipped with valve stems 14 consisting of tubular sections a and b, the latter sections b each having a conventional valve train mounted therein adjacent the free ends thereof and being adapted to receive a terminal dust cap (not shown).

The current-conducting assemblage comprises a ring contact element rigidly mounted on the hub of the dual wheel and a co-operating, elastically mounted ball-bearing contact element, both of which elements are interposed in the circuit of a tire pressure indicator that includes a dash signal and electro-pneumatic switches, which latter are carried by said valve stems, all of which will now be described in detail.

The ring contact member, which is designated by the numeral 15, includes an annular base 16, formed of fiber, Bakelite or the like, having lugs 17 disposed at intervals along its periphery, the same having apertures 17' for the reception of said bolts 6 which also serve to rigidly connect such base to the rotatory brake-drum of the wheel. Said insulated base serves as a support for a ring contact element 18 having a marginal rail or track 19, which contact element is secured to said base by rivets 20.

The co-operating contact element of the current-conducting assemblage comprises a skeleton frame 25 having a pair of opposing angular lateral arms 26, 26' connected by a cross bar or saddle 27. Said arms converge beyond said saddle and are apertured to receive a pin 28 which is rigidly connected to said arms 26, 26' that in turn rigidly clamp between them the inner race-way A of a ball-bearing contact element 29 of the ball separator type, whose outer race-way B is adapted, as hereinafter explained, to normally engage said rail 19. A block 30 of insulation material is mounted between said arms 26, 26' at the rear ends thereof and said arms are pivotally connected thereto by a pin 31. Said block is secured by pins 32 to a metal strip 33, which latter is secured by cap screws 34 to a bracket or support member 35 that is bolted to the stationary brake-support member 7. Said insulation block is cut away at its front end to form a niche C for the reception of a compression spring 36 that is interposed between the bottom of said niche, which serves as an abutment therefor, and the saddle 27 to which its upper end is brazed or otherwise rigidly connected. The top or overhang of said niche serves as a stop to limit the upward movement of said saddle, together with the arms 25 carried thereby, under the urge of the spring 36, when a wheel that is equipped with a ring contact member 15, is removed from its axle. Said spring serves to continually maintain the outer raceway B of the ball-bearing 29 in good electrical contact with the aforesaid rail 19 at all times when the wheel is mounted on its axle, whether rotating or stationary.

A single armored cable 39 and two cables 40, 40' of the well-known BX cable type, serve to connect the ball-bearing contact element 29 and the ring contact element 18 into the circuit of battery D. The insulated metal core $e$ of the cable 39 is brazed or otherwise metallically connected to the frame 25 of the ball-bearing contact element and to the non-grounded terminal of battery D. The metal armor $c$ of each of the cables 40, 40' is secured to lugs $d$ that are grounded to the vehicle frame, while the end of each metal core $e$ thereof, which are insulated from the armor by insulation sheaths $f$, is respectively brazed or otherwise metallically connected to diametrically opposite sides of said ring contact member. The other end of each core $c$ of cables 40, 40' is connected respectively to a hollow contact pin 41 of different electro-pneumatic switch members 42, one of which latter is interposed between the sections $a$ and $b$ of the valve stems of each tire whose fluctuations in pressure are to be observed.

These electro-pneumatic switch members 42 each comprise a cylindrical housing 45, having a cylindrical offset portion 46 adjacent one end thereof. A metallic bellows 47, of the expansive type, commonly termed a Sylphon bellows, is mounted within the main pressure chamber E of said housing. A tubular liner 50 of spring metal, having a circular end flange 51, is fitted within said bellows, its flange being brazed or soldered to the end convolution thereof to hermetically seal the joint therebetween. At its opposite end, said liner is spun over so as to snugly engage the reduced end of a hollow tubular plug or follower member 52 that is closed at its outer end and open at its inner end. An annular recess 53 is formed on the outer wall of the follower and in the bottom of said recess there is a circular central rib 54, of triangular cross-section, which functions as hereinafter explained.

The outer end of the housing is slightly counter-bored to receive a metal closure disk 55 which has a circular boss 56 that snugly fits into the open flanged end of the liner 50 formed of spring metal, preferably Phosphor bronze. The latter has four longitudinal slits 57 cut therethrough which serve to form opposing elastic strips 58 and these are centrally crimped to form angular detent elements 59 that normally project into said recess 53 to one side of the said knife-like rib 54. The respective faces of the detents 59 and of the rib 54 function as cam surfaces to permit the detents to ride up and over the said rib, subject to a slight retarding action during their progress thereover.

As shown, the liner 50 is somewhat shorter than the bellows and this permits of the limited contraction of the latter when the external air pressure on the bellows (which pressure, as hereinafter explained, corresponds substantially to the internal pressure prevailing at any moment in the inner tube with which the pneumatic switch that contains such bellows is associated) exceeds the atmospheric pressure prevailing at all times within the bellows. The flange 51 is brazed to the metal disk 55 in order to hermetically seal the joint therebetween.

A compression spring 60 is mounted within the said follower 52 and the tension thereof is adapted to be regulated by means of the adjusting screw 61 that is threaded into the tapped central hole 61' in the disc 55. Said spring serves to normally urge the follower 52 against the bottom of the bellows and to thereby, in turn, urge the latter to seat against a contact pin 41 that is drilled to receive the terminal of the core $e$ of cable 40 or 40' and which terminal is firmly retained therein by a set-screw.

A metal closure cap 64 is threaded on one end of the housing, the same being apertured to receive the cable 40 or 40', whose armor is metallically connected, preferably by a fillet weld, to the cap 64. The cap is counterbored to receive the flanged insulator plug 65, which latter is drilled to receive the said contact pin 41, that is desirably molded therein, and is also of reduced section at its inner end 66 to admit of its being inserted into the apertured end of housing 45. A gasket 69 is preferably interposed between one end of the housing and plug 65 to maintain an hermetic seal therebetween.

The opposite end of the housing 45 is closed by a screw cap 70 which serves to compress a gasket 71 so as to hermetically seal the joints between the housing 45 and the annular face of the disc 55 and between the outer end of the housing 45, and said cap 70.

Said supplemental housing 46 has a secondary air chamber F therein which is in permanent communication with the main compression chamber E and also in permanent communication, through the section $a$ of stem 14, which discharges thereunto, with the air within the inner tube. The housing has a boss 76 formed thereon which is tapped to receive the said section $a$ of the valve stem. An aperture $g$ in the side wall of the housing 46 affords permanent communication between the section $a$ and the chamber E. The joint between section $b$ of the valve stems 14 and housing 46 is hermetically sealed by a fillet weld or otherwise and the washer 77 admits of an air-tight joint being obtained between the end of the section $a$ and the wall of housing 46.

The cables 40, 40', as shown, are provided with electrical coupling plugs $l$, of the well-known type, which admit of the sections thereof being instantly separated when it is desired to remove a wheel of the vehicle.

As illustrated schematically in Fig. 2, one terminal of the dash signal is connected to the non-grounded terminal $m$ of the ignition switch of the vehicle while the other terminal is connected to the ball-bearing contact element 29 via the core $n$ of cable 39 that passes through the stationary brake-support plate 7. The other terminal of the ignition switch is grounded in the customary manner to the frame of the vehicle to which the other terminal of the battery D and the armor of the cables 40 are also grounded. Consequently, when both ignition switch and one of the switches 42 are closed, the dash signal, whether a visual signal, an audible signal, or both, will be operated and vice versa, when the ignition circuit or any one of the switches 42 is open, the dash signal will not operate. Preferably the selective dash instrument, having a single signal as disclosed in my Patent No. 2,135,303, is employed in lieu of providing a separate dash signal for each wheel that is equipped with my improved tire protective system.

Referring to the electro-pneumatic switch 79, shown in Fig. 9, the reference numeral 80 designates a housing, having a pressure chamber G and offset hollow bosses 81, 81', which is adapted to be interposed between the sections 82 and 82' of the valve stem, the section 82 and the boss 81' having right and left threads, respectively, for the reception of a coupling 83 whereby, when a gasket 84 is interposed between the ends of section 82 and the boss 81', then can all be drawn together to form an air-tight joint therebetween. In this modification the snapping element of the switch mechanism consists of a spring-metal disk element 85, formed of spring steel, Phosphor bronze or the like, the same being rigidly mounted on a post 86, having a conical contact element 86', that is carried by a flanged terminal plug 87, which hermetically seals one end of a metal bellows unit 88, desirably of the so-called Sylphon type, said post having an air-tight fit with said plug or being soldered or brazed thereto in such a manner that the joints therebetween are hermetically sealed. A spacing sleeve 89, which serves as a liner for the chamber G, is tightly fitted into the housing 80 and its inner end serves as an abutment or stop for the entire margin of said disk when it has assumed a convex position and the switch is closed while the outer end of the sleeve serves as an abutment for the flanged closure plug 90 that is hermetically united, by brazing, soldering or otherwise, to the other end of the bellows. A centrally apertured screw plug 91, having a reduced inner end 91', is threaded into the plug 90 and the said plug serves to regulate the compression of a coil spring 92 whose ends envelop and are centered by the said reduced end 91' and the shank of the post 86, respectively. A duct 93, which extends centrally through the plug 91, serves to establish communication between the interior of the bellows and the outside air and thereby insures that atmospheric pressure will prevail therein at all times, irrespective of the pressure of the air in the surrounding main pressure chamber G which latter is in permanent communication, through section 82 of the valve stem, with the air of the inner tube of the tire on which the switch is mounted. A sleeve 94 into which said plug 87 is tightly fitted serves as a guide for the coils thereof and also as a stop to prevent the undue collapse of the bellows beyond its critical limit in the event of the pressure in the chamber G should be excessive, due to overinflation of the tire.

Opposing arcuate niches or grooves 95, 95' formed in the walls of the bores of the hollow bosses 81, 81', serve to receive and retain the adjacent portions of the margin of the disk 85 while admitting of very limited movement of these marginal portions during its snapping actions, as hereinafter explained, in response to variations of air pressure in the chamber G. A metal pin 96 having a terminal contact element 96' is mounted in an insulation bushing 97 that is carried by the plug 97 which seals one end of the housing. Said contact 96' is adapted, in cooperation with the grounded contact element 86' carried by the disk, to control the flow of current through the switch in response to the snapping movement of the disk 85. A hole 99 is drilled in the metal pin 96 for the reception of a terminal of the core $e$ of a cable 40 or 40', which terminal is connected to the non-grounded terminal $k$ of the battery D.

As will appear from the foregoing description of Figs. 1–8, when the inner tubes of the tires of a dual wheel are inflated to an optimum super-atmosphere pressure, such pressure will obtain in the air chambers E and F of a housing 42, whereas the air within the bellows 47 will be at atmospheric pressure. When the air pressure in the chambers E and F drops below the pre-determined optimum, to which the spring 58 is adjusted by means of the adjusting screw 61, the bellows 47, whose inner end is normally out of contact with the contact element 41 when such optimum prevails, will gradually expand under the influence of the spring-pressed follower 52, until the rib 54 on the follower engages the inclined adjacent face of the detent 59. Thereupon, since such detent is longitudinally held against movement, the further expansion of the bellows will be interrupted until sufficient differential between the tire pressure and the spring pressure is built up to cause the rib 54 to suddenly ride-up the incline or cam face of the detent and over the peak of the detent and thereby effect sudden engagement of the contact pin 41 and the adjacent end of the bellows with the consequent quick "make" of the battery circuit and the illumination or actuation of the dash signal interposed therein. This condition will continue to prevail until either the ignition switch or a switch in the selective dash instrument aforesaid is opened, or until the tire is re-inflated to the optimum pressure or the circuit through the dash signal is otherwise deliberately interrupted.

The operation of the electro-pneumatic switch 79, shown in Fig. 9, to "make" or "break" the circuit of the dash signal is generally similar to the above described with respect to the electro-pneumatic switch 42, except that in lieu of employing the follower 52 and the co-operating detent element 59 to effect the sudden closing of the circuit through the dash signal when the tire pressure falls below the pre-determined limit, the snapping disk 85 is associated with the bellows as above explained to accomplish the desired "make" and "break" movements as follows:

As the tire pressure in the chamber G drops below the pre-selected minimum as determined by the sprung adjustment, the bellows gradually expands and such movement initiates a gradual outward movement of the contact element 86' toward the opposing contact 96'. Since the disk is prevented by the outer wall of the niches 95, 95' from expanding laterally, such outward movement of the central portion thereof and of the contact element 86' carried thereby stores up potential energy due to the stresses set up therein and consequently as the center of the disk approaches or assumes the position in a median line that includes a point in each of its opposing margins, said disk will suddenly snap and effect the snapping "make" of the circuit through the co-operating contacts 86' and 96', thereby effecting the actuation of the dash signal. When the pressure in the chamber G, upon the re-inflation of the tire, exceeds the aforesaid minimum pressure for which the spring 92 is adjusted or at approximately that point, the disk 85 will commence to flatten out from the convex form it had assumed upon the closing of the circuit as above explained and such action will effect the gradual separation of the contact elements 86' and 96'. However, as the ignition has almost invariably been opened before re-inflation, no arcing across these contacts will occur.

Since the margin of the disc, once it has snapped into a convex shape will continually press during the re-inflation of the tire against the end of the spacing or abutment sleeve 89, it will, due to the potential energy again stored up in such disc during its initial slow return movement, suddenly snap into a concave shape on attaining the critical snapping position and thereby open the circuit between the contact elements 86' and 96' which elements will thereupon remain separated, irrespective of road or other shocks until, due to a subsequent deflation of the tire, the disc again effects the snapping engagement.

In the modification illustrated in Fig. 9, due to the different angle at which the longitudinal axis of the housing 79 projects as compared with the angle at which the longitudinal axis of the housing 42 projects, said housing will lie substantially entirely in the plane of the wheel and snugly hug the rim thereof.

My improved current conducting assemblage, as herein described, is ideally adapted for installation both for new equipment during the assembly thereof at the factory as well as for installation as an accessory upon used equipment in the field. It is foolproof, highly positive in its operation and is so protected that no mud or water through which the vehicle travels interferes in any way with the successful operation thereof. The wheels of the vehicle can be readily removed in the manner now customary, without necessitating the splitting apart of the raceways of the loadless bearing assemblages, merely by first uncoupling the respective sections of the valve stems and the cables connected thereto and then removing the electro-pneumatic switch housings from the base sections of the valve stems of the tires. Moreover, since as will be apparent by an inspection of Figure 1, the wheel has no rim save that formed by the tire felloes 10 and 10' that are carried on the outer end of a spider formed by the spokes radiating from the hub 2 and between pairs of which the valve stems $a$ and $b$ extend, the tires can be readily removed from their rims in the customary manner without structural interference with said stems.

Having thus described my invention, what I claim and desire to secure by Letters Patent is:

A current conducting assemblage for bridging the air gap between a vehicle body and a wheel thereof, the same comprising the combination with a vehicle body, including its supporting frame, of an axle, a wheel rotatably mounted thereon having a hub portion in metal-to-metal contact with said axle, a ring contact element enveloping said axle and mounted on said wheel, the same being rotatable therewith and normally insulated from the vehicle frame, an anti-friction bearing member, also normally insulated from said frame, the same constituting a co-operating contact element yieldably mounted on a non-rotatable support carried by the vehicle body and being spring-pressed in the direction of said ring contact element, said bearing having inner and outer concentrically disposed raceways and rolling elements interposed therebetween, the plane of rotation of said ring contact element being normal to the plane of rotation of the said raceways of said bearing member and the outer periphery of said outer race-way being transversely rectilinear and being normally, when said wheel is mounted on its axle, in continual contact with the outer face of the ring contact element, a source of electricity having terminals of opposite polarity, carried by said vehicle and having one of its terminals grounded to the vehicle body, and an electrical conductor permanently electrically connecting the other terminal of said source of electricity with said co-operating contact element and normally insulated from the vehicle body.

EDGEWORTH GREENE.

REFERENCES CITED

The following references are of record in the file of this patent:

UNITED STATES PATENTS

| Number | Name | Date |
| --- | --- | --- |
| 1,019,340 | McGowan et al. | Mar. 5, 1912 |
| 1,392,912 | Chesnutt | Oct. 11, 1921 |
| 1,599,846 | Sinclair | Sept. 14, 1926 |
| 2,063,452 | McDonnell | Dec. 8, 1936 |
| 2,113,474 | Edmonston | Apr. 5, 1938 |

FOREIGN PATENTS

| Number | Country | Date |
| --- | --- | --- |
| 341,095 | Italy | June 9, 1936 |
| 11,758 | England | of 1908 |